(12) United States Patent
Lin

(10) Patent No.: US 7,856,904 B2
(45) Date of Patent: Dec. 28, 2010

(54) MULTI-FUNCTION PEDALS FOR BICYCLES

(75) Inventor: Wen-Hwa Lin, Taichung Hsien (TW)

(73) Assignee: VP Components Co., Ltd., Waipu, Taichung Hsien (TW)

( * ) Notice: Subject to any disclaimer, the term of this patent is extended or adjusted under 35 U.S.C. 154(b) by 1178 days.

(21) Appl. No.: 11/333,081

(22) Filed: Jan. 17, 2006

(65) Prior Publication Data

US 2007/0175293 A1    Aug. 2, 2007

(51) Int. Cl.
*B62M 3/00* (2006.01)
(52) U.S. Cl. .................... 74/594.6; 74/594.4
(58) Field of Classification Search ............ 74/594.4, 74/594.6; B62M 3/08; G05G 1/14
See application file for complete search history.

(56) References Cited

U.S. PATENT DOCUMENTS

| | | | | |
|---|---|---|---|---|
| 5,060,537 A | * | 10/1991 | Nagano | 74/594.6 |
| 5,497,680 A | * | 3/1996 | Nagano | 74/594.6 |
| 5,692,415 A | * | 12/1997 | Lin | 74/594.6 |
| 6,035,743 A | * | 3/2000 | Gapinski et al. | 74/594.6 |
| 6,230,583 B1 | * | 5/2001 | Ohno | 74/594.6 |
| 6,520,048 B2 | * | 2/2003 | Chen | 74/594.6 |
| 6,877,399 B1 | * | 4/2005 | Swift | 74/594.6 |
| 7,073,409 B2 | * | 7/2006 | Ho | 74/594.6 |
| 2010/0005924 A1 | * | 1/2010 | Servignat et al. | 74/594.6 |

* cited by examiner

*Primary Examiner*—Vinh T. Luong
(74) *Attorney, Agent, or Firm*—Charles E. Baxley

(57) ABSTRACT

A multi-function pedal includes a body, wherein a pivot hole is disposed in the center for connection to the crank of a bicycle; a first surface and a second surface, wherein the first surface is sloping at a predetermined gradient while the second surface is approximately parallel to the body. The first surface includes a first pedal set for a road-racing purpose and the second surface includes a second pedal set for a cross-racing purpose.

7 Claims, 5 Drawing Sheets

MULTI-FUNCTION PEDALS FOR BICYCLES

BACKGROUND OF THE INVENTION

1. Field of the Invention

The present invention relates to multi-function pedals for bicycles and, more particularly, to multi-function pedals, which comprise a pair of bicycles pedals for road-racing and cross-racing purposes.

2. Description of the Related Art

As shown in FIG. 1A, a prior-art bicycle pedal comprises a front clasp 2 and a pivotable rear clasp 3 both disposed on a pedal body 1. Further, said rear clasp 3 is provided with torsion by a torsion spring to normally keep fastened. A cleat, which is settled on the sole of a common bicycle-racing shoe, can be retained between the front clasp 2 and rear clasp 3 to fix the user's foot thereon so that a possible injury to the foot caused by accidental slips can whereby be avoided.

Since bicycle races are generally divided into road races and cross races which require different riding skills and conditions, the pedal is designed with a road-racing set and a cross-racing set on each side having various dimension and shapes for the user's option.

However, the prior-art pedal, as shown in FIG. 1B, may usually stay vertical to the ground when being installed on a bicycle because of the different weights of its two ends caused by the improper arrangement of components. It would be difficult for the user to hook the small cleat (about only 3 to 4 cm$^2$) of a racing shoe between the clasps readily because a further manual adjustment of the pedal may be required.

SUMMARY OF THE INVENTION

The present invention has been accomplished under the circumstances in view. The object of the present invention is to provide a structure of a pedal, which comprises a sloping first surface with a predetermined gradient and a relatively parallel second surface disposed on each side of a pedal body, a first pedal set and a second pedal set further respectively arranged on said first surface and second surface. Said two pedal sets can respectively be appointed as either a road-racing set or a cross-racing set. When the pedal is balanced on the pivot shaft of a bicycle, said first surface could be kept in a position approximately horizontal due to gravity. Thus, it would be more convenient for the user to use the first pedal set, herein namely the road-racing set, without manual modulation.

To achieve this and other objects of the present invention, the invention comprises:

a multi-function pedal, which consists of a body with a first surface and a second surface. Wherein, the first surface is sloping at a predetermined gradient while the second surface is approximate parallel to the body. A first pedal set is arranged on said first surface and a second pedal set is arranged on said second surface.

DETAILED DESCRIPTION OF THE PREFERRED EMBODIMENT

Figure 1A:
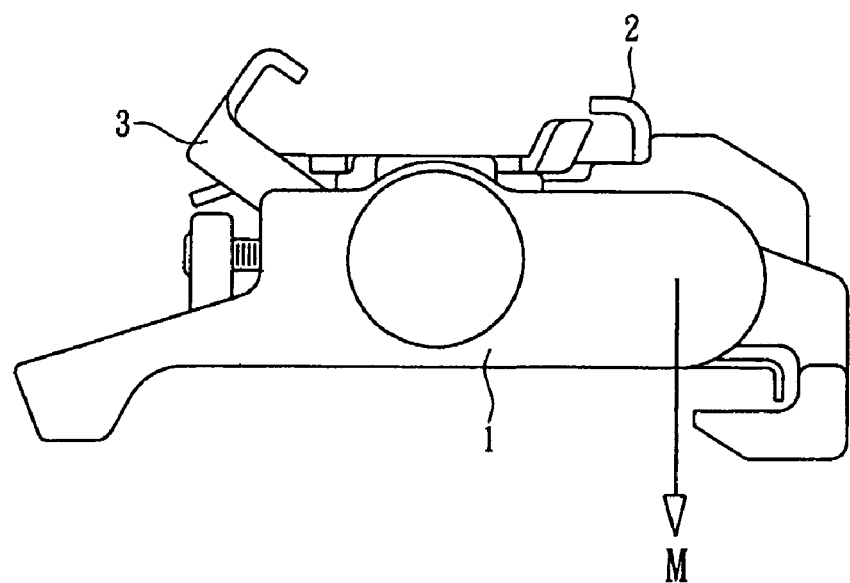
FIG. 1A is a lateral plan view of a dual-purpose bicycles pedal according to the prior art.
Figure 1B:
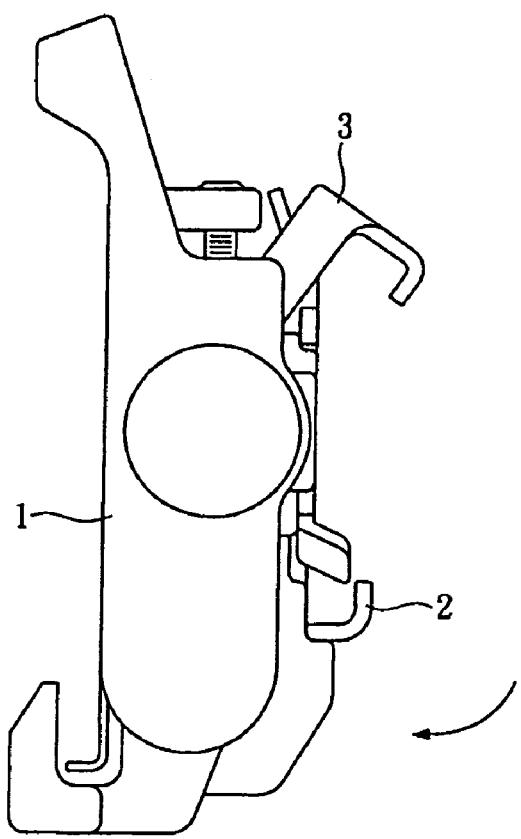
FIG. 1B is an applied view of a dual-purpose bicycles pedal according to the prior art.
Figure 2:
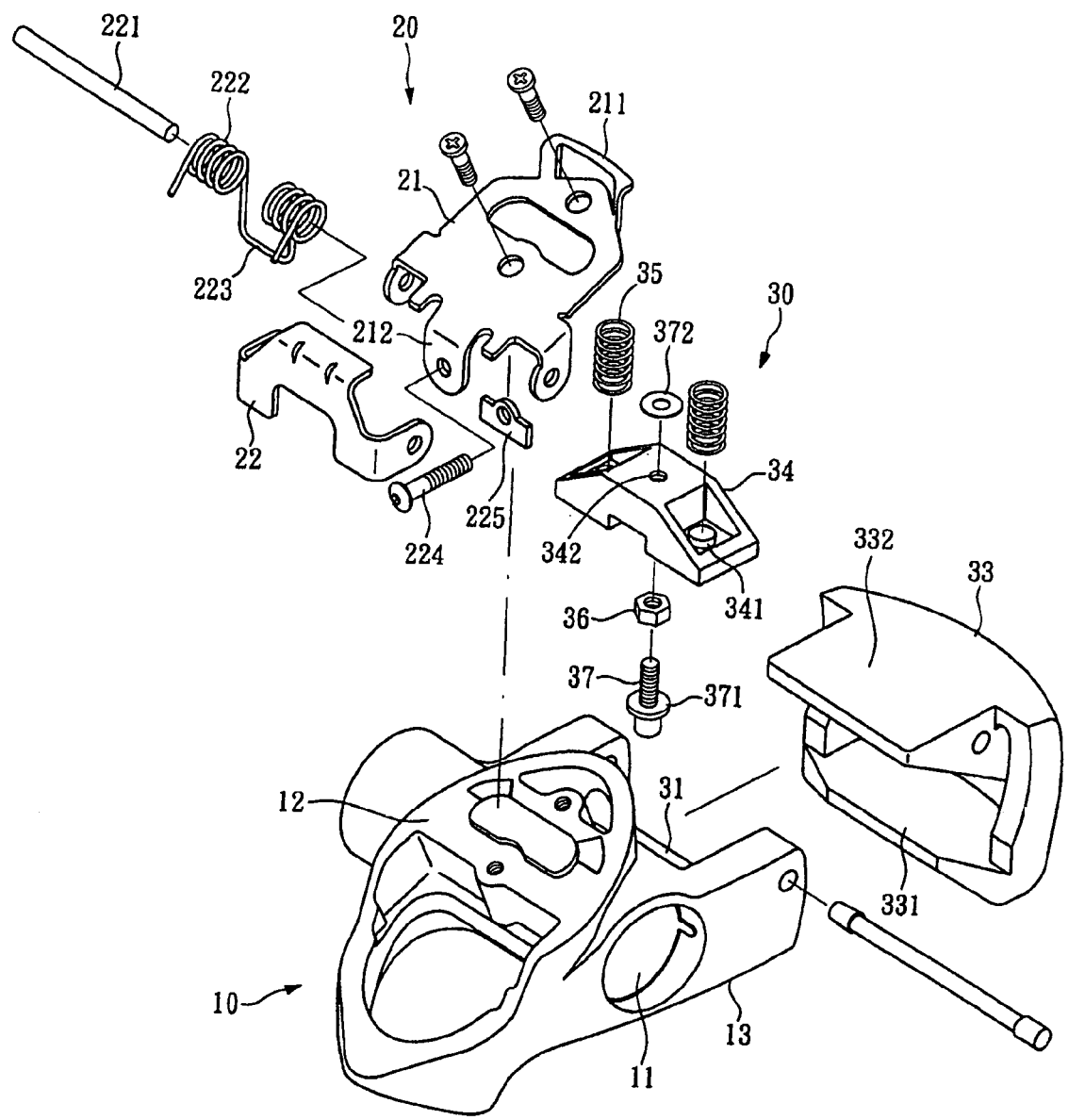
FIG. 2 is an exploded view of a Multi-Function Pedal according to the present invention.
Figure 3:
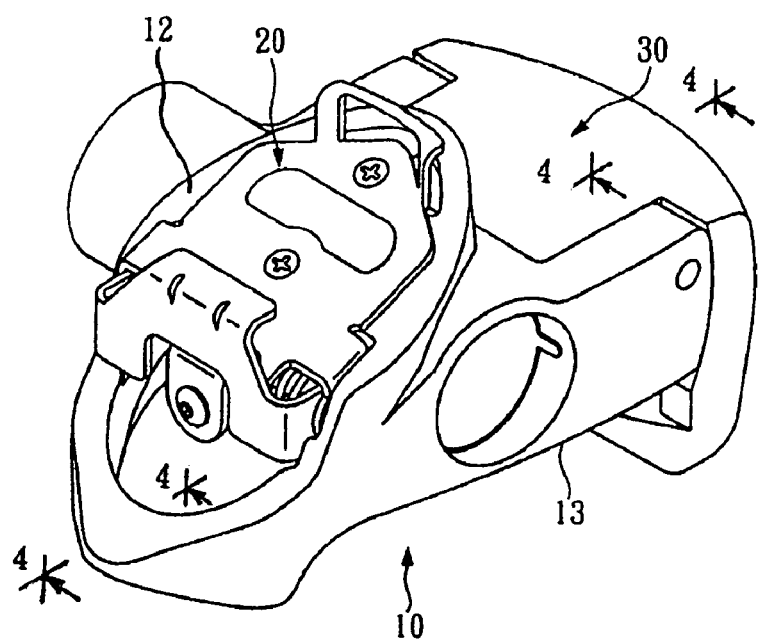
FIG. 3 is an elevation of a Multi-Function Pedal according to the present invention.
Figure 4:
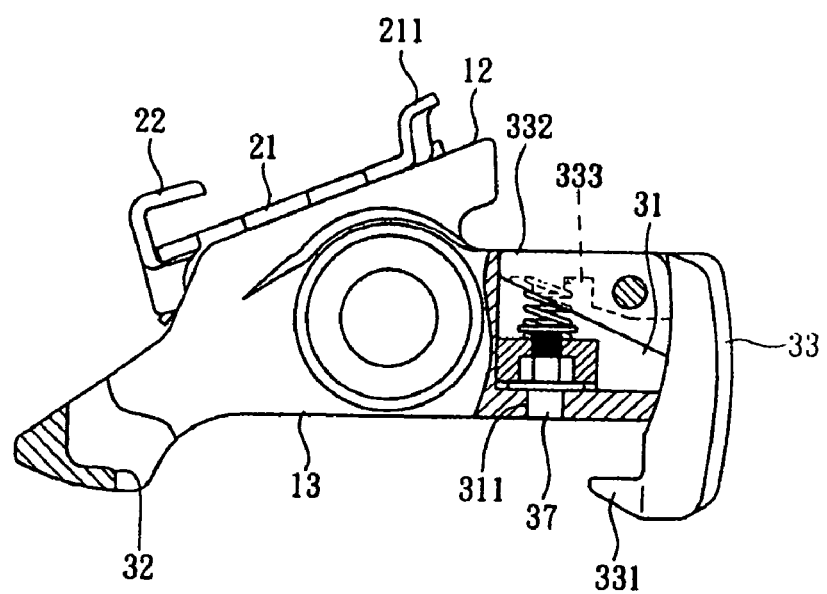
FIG. 4 is a side elevation view of a Multi-Function Pedal according to the present invention partially in section with the sectional views taken along the Line 4-4 of FIG. 3.

As shown in FIGS. 2 to 4, a multi-function pedal for bicycles according to the present invention comprises:

a body 10, wherein the a pivot hole 11 is disposed in the center for connecting to the crank of a bicycle; a first surface 12 and a second surface 13 wherein the former is sloping at a predetermined gradient while the latter is approximate parallel to the body 10;

a first pedal set 20, which is arranged on the first surface 12, comprising a front clasp 21 with a retaining flange 211 at its front end; a rear clasp 22 which is connected to the front clasp 21 by a pivot pin 221; a torsion spring 222 which is disposed on the pivot pin 221 having a adjusting section 223; a tongue 212 which is extended from the rear end of the front clasp 21, having a screw 224 passing through said adjusting section 223 and then fastened with a fastening unit 225 to keep the rear clasp 22 normally staying close with said front clasp 21, wherein the user can change the pressure form said fastening unit 225 to adjusting section 223 by screwing the screw 224 to adjust the torsion of the torsion spring 222.

a second pedal set 30 including a chamber 31 recessed in one end of the body 10 wherein the chamber 31 is opened toward the upside and rear side of the body; a one-piece fastener 32 disposed on the second surface at the other end of the body 10 opposite to the chamber 31; a hooked plate 33 with one end pivotly fixed in the chamber 31 having its the other end turned toward the pivot hole 11 and forming a retaining hook 331 which is sticking out of the second surface 13;

a cover 332 is disposed at the end of the hooked plate 33 above the chamber 31, a seat 34 disposed on the second pedal set 30 extending toward the chamber 31, further comprising a shaft 341 which holds a spring 35; a ring groove 333 correspondingly provided inside said cover 332 to retain the other end of the spring 35 whereby when the spring 35 normally lifts the cover 332, the hooked plate 33 and its retaining hook 331 keep relatively close to the edge of the second surface 13, a adjusting hole 342 provided on the seat 34 accommodating a hexagonal nut 36 which allows a bolt 37 threading through and screwing thereon; a prominent rim 371 of the bolt 37 formed with its position between said seat 34 and the wall of the chamber 31 against the second surface 13, a retainer 372 riveted with the tail of the bolt 37 whereby the interval between the seat 34 and the wall of the chamber 31 against the second surface 13 can be adjusted by screwing the bolt 37, a through hole 311 provided on the wall of the chamber 31 correspondingly to the bolt 37 whereby said bolt 37 can be exposed on the second surface 13 of the body 10.

Figure 5A:
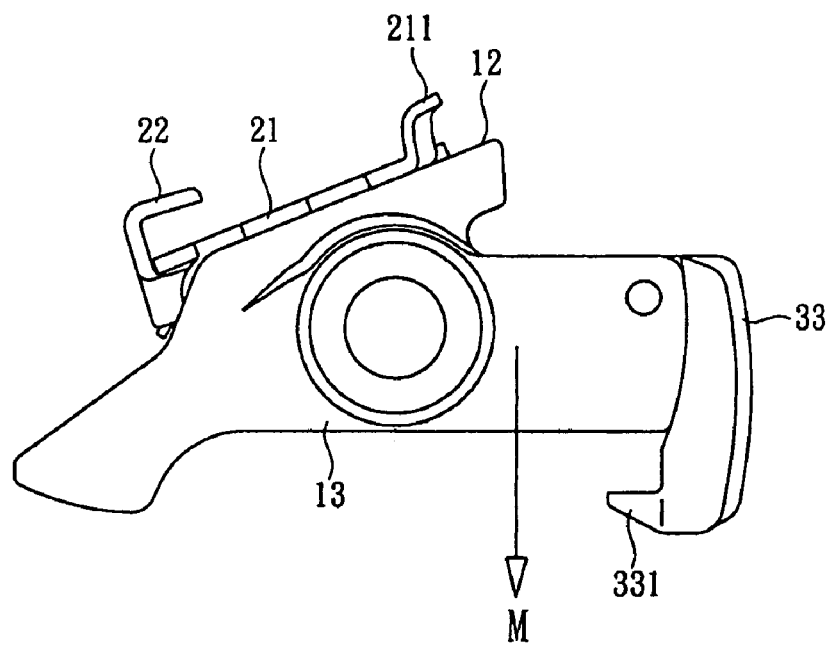
FIGS. 5A and 5B are side elevation views of a Multi-Function Pedal according to the present invention.
Figure 5B:
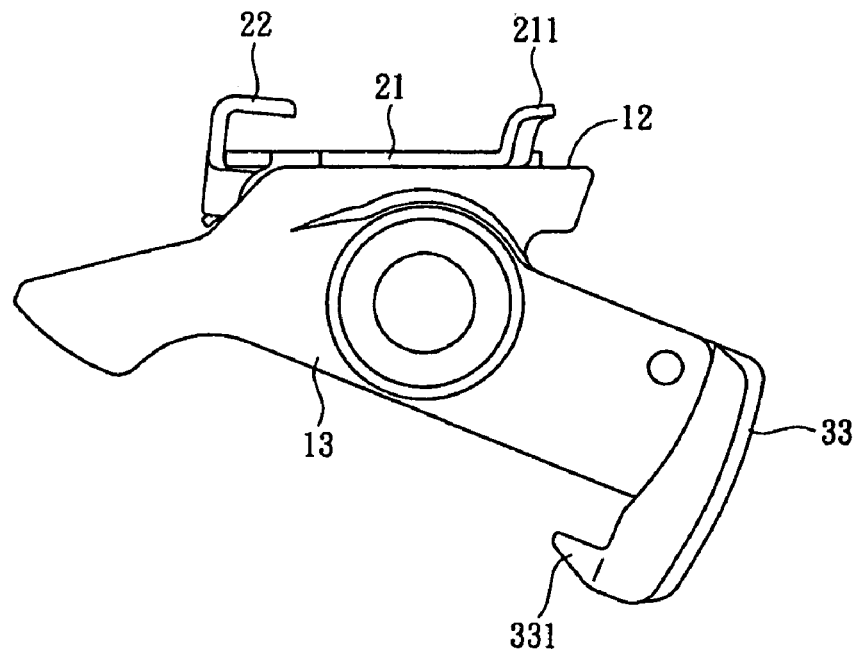

Referring to FIGS. 5A and 5B, when the pedal body 10 keeps balanced on the pivot shaft of a bicycle, the first surface 12 becomes approximately horizontal because of gravitation. Thus, it would be advantageous to the user to rapidly retain the small cleat of the road-racing shoe between the retaining flange 211 and rear clasp 22 without further manual adjustment in the gradient of said surface and body 10.

Figure 6A:
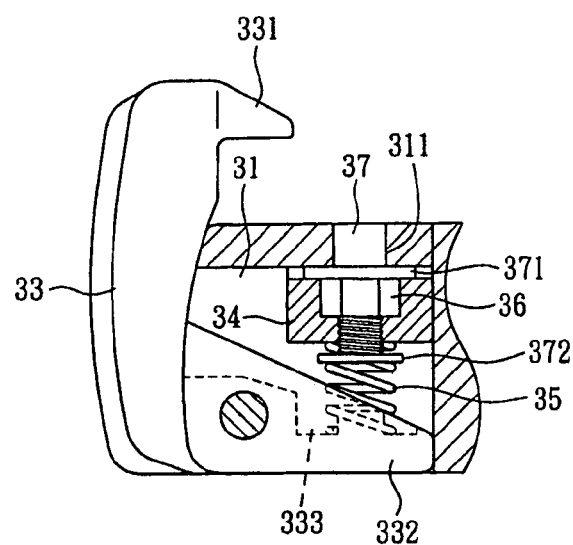
FIGS. 6A and 6B are fragmentary sectional views taken along the Line 4-4 of FIG. 3 showing the action of a hooked plate according to the present invention.
Figure 6B:
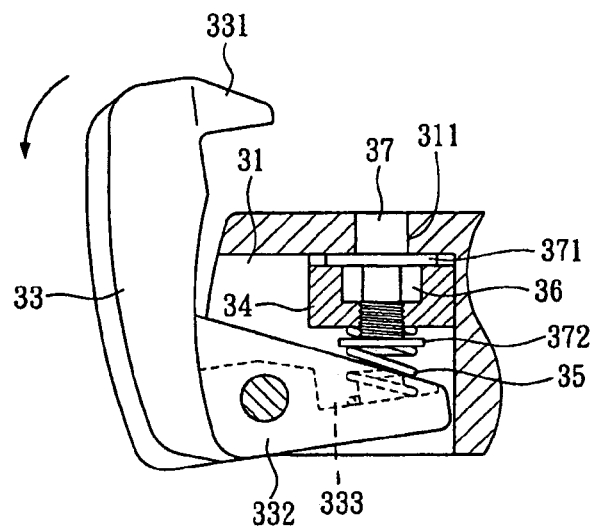

As shown in FIG. 6A, when the user is about to adopt the second pedal set 30, he needs only rotate the body 10 to make the second surface 13 upward, and put the front end of shoe cleat in the fastener 32. Then treadles the body 10 to slide the rear end of cleat along the retaining hook 331. Then the hooked plate 33 is pushed outward to bring and the cover 332 to compress the spring 35 backward to the chamber 31 (as shown in FIG. 6B). Thereafter, the resilience of the spring 35 subsequently drives the cover 332 as well as hooked plate 33 back to their former positions therefore the cleat would be tightly held by the retaining hook 331.

Figure 7:
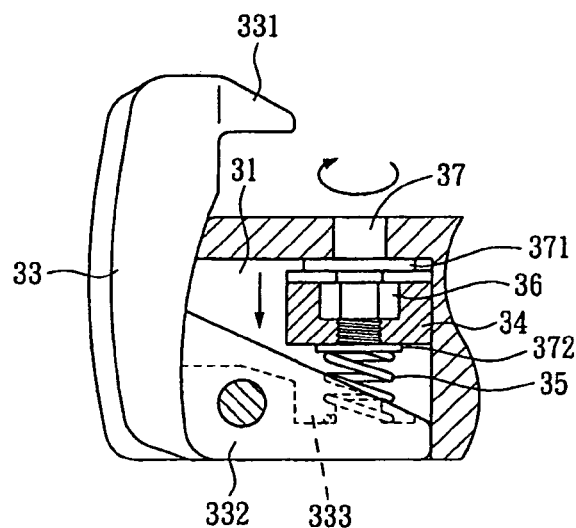
FIG. 7 is a fragmentary sectional view taken along the Line 4-4 of FIG. 3 showing the actions of a seat according to the present invention.

Further referring to FIG. 7, the prominent rim 371 presses the wall of the chamber 31 by the force of the spring 35. When the user uses a tool, for example, a screwdriver, to screw the bolt 37 at the through hole 311, the move of the bolt 37 would change the distance between the seat 34 and the wall of the chamber 31, and further cause the lifting force of the spring 35 various. Additionally, even if the user screwing the bolt 37 excessively, the retainer 372 helps to prevent the bolt 37 from coming off the body 10.

The description of the present invention has been presented for purposes of illustration and description, and is not intended to be exhaustive or limited to the invention in the form disclosed. Various modifications and enhancements may be made without departing from the spirit and scope of the invention.

What the invention claimed is:

1. A multi-function pedal comprising:
    a body, with said body having a pivot hole;
    a first surface formed on said body;
    a second surface formed on said body and non-parallel to said first surface;
    a first pedal set disposed on said first surface, wherein said first pedal set comprises:
        a front clasp;
        a rear clasp;
        a single pivot pin directly connecting said front clasp and said rear clasp, and
        a single torsion spring disposed on said pivot pin;
    a second pedal set disposed on said second surface.

2. The multi-function pedal as claimed in claim 1 wherein said torsion spring comprises:
    an adjustment section.

3. The multi-function pedal as claimed in claim 2 further comprising:
    an adjustment screw for adjustment of said adjustment section of said torsion spring.

4. The multi-function pedal as claimed in claim 1 wherein said second pedal set comprises:
    a chamber formed in said body;
    a hooked plate having an end;
    a pivot connecting said hooked plate and said chamber, and
    a helical spring disposed between said hooked plate and said chamber.

5. The multi-function pedal as claimed in claim 4 wherein said helical spring is generally perpendicular to said second surface.

6. The multi-function pedal as claimed in claim 5 further comprising:
    an adjustment bolt for adjustment of said helical spring.

7. The multi-function pedal as claimed in claim 6 wherein said adjustment bolt comprises:
    a rim portion and
    a retainer portion.

* * * * *